F. PHELPS.
COTTON FOLDER.
APPLICATION FILED MAR. 3, 1908.

931,474.

Patented Aug. 17, 1909.
9 SHEETS—SHEET 3.

F. PHELPS.
COTTON FOLDER.
APPLICATION FILED MAR. 3, 1908.

931,474.

Patented Aug. 17, 1909.
9 SHEETS—SHEET 4.

Fig. 5.

Witnesses
Harry King.
Edward R. Whitman

Inventor
Frank Phelps
By Julian C. Dowell & Son,
his Attorneys.

F. PHELPS.
COTTON FOLDER.
APPLICATION FILED MAR. 3, 1908.

931,474.

Patented Aug. 17, 1909.
9 SHEETS—SHEET 5.

Witnesses
Harry King
Edward R. Pitman

Inventor
Frank Phelps
By Julian C. Dowell
his Attorneys

F. PHELPS.
COTTON FOLDER.
APPLICATION FILED MAR. 3, 1908.

931,474.

Patented Aug. 17, 1909.
9 SHEETS—SHEET 6.

Witnesses
Harry King
Edward R. Whitman

Inventor
Frank Phelps
By Julian C. Dowell
his Attorneys

F. PHELPS.
COTTON FOLDER.
APPLICATION FILED MAR. 3, 1908.

931,474.

Patented Aug. 17, 1909.
9 SHEETS—SHEET 7.

Witnesses
Harry King.
Edward R. Whitman

Inventor
Frank Phelps
By Julian C. Dowell
his Attorneys.

F. PHELPS.
COTTON FOLDER.
APPLICATION FILED MAR. 3, 1908.

931,474.

Patented Aug. 17, 1909.
9 SHEETS—SHEET 8.

Fig. 15.

WITNESSES
Harry King.
Edward R. Whitman

INVENTOR
Frank Phelps
By Julian C. Dowell
his Attorneys.

UNITED STATES PATENT OFFICE.

FRANK PHELPS, OF WELLSTON, OKLAHOMA, ASSIGNOR TO THOMAS GIN COMPRESS COMPANY, OF LITTLE ROCK, ARKANSAS, A CORPORATION OF NEW JERSEY.

COTTON-FOLDER.

No. 931,474.     Specification of Letters Patent.     Patented Aug. 17, 1909.

Application filed March 3, 1908. Serial No. 419,019.

*To all whom it may concern:*

Be it known that I, FRANK PHELPS, a citizen of the United States, residing at Wellston, in the county of Lincoln and State of Oklahoma, have invented certain new and useful Improvements in Cotton-Folders; and I do hereby declare the following to be a full, clear, and exact description of the invention, such as will enable others skilled in the art to which it appertains to make and use the same.

This invention relates to cotton-folders or apparatus used in connection with certain types of cotton-presses for assembling a bat of cotton into folds or superposed layers, under such degree of pressure as desired, preparatory to compressing the same into a bale. These apparatus are commonly used in connection with so called double presses having two baling-chambers or press-boxes adapted to be shifted to bring them alternately into position for receiving the cotton and alternately into position for pressing the same into a bale. In modern presses of this character the two baling-chambers or press-boxes are usually mounted on a revoluble platform or turn-table whereby each press-box is in turn transferred from the receiving to the finishing side of the press, and while a bale is being formed by folding of the bat in one press-box the cotton in the other press-box is being compressed to the requisite density of the finished bale. The foregoing is merely explanatory of the type of press to which the folder is most commonly applied, but is not intended to restrict my invention thereto since the cotton-folder may be and is in some cases used differently. For example, it is or may be employed for laying a cotton bat in the same press-box in which it receives its final baling pressure.

The general object of my invention is to provide a more practicable and efficient cotton-folder than heretofore; and more specifically my invention provides certain improvements in cotton-folders of the reciprocating and alternating rolls type, the drive means therefor, the folder-carriage, and the means for reciprocating the same.

With reference to the accompanying drawings, which form a part of this specification, my invention will hereinafter be fully described, and will then be more particularly pointed out in the claims at the end of this description.

The folder is arranged to travel back and forth in the usual way over the baling-chamber or press-box in which the cotton bat is to be laid in folds.

Let A represent the baling-chamber or press-box. Its movable bottom or follower $A^1$, sustained by a receding platen $A^2$ and adapted to be raised and lowered, receives the first layer of cotton at an elevated position and gradually descends as the folds are successively laid one upon the other, at the same time allowing any desired degree of pressure to be exerted upon the accumulating cotton, as well understood. For the purpose of this description, the press-box A may be considered as carried by a revoluble platform or turn-table (not shown), so that when filled with cotton the press-box can be swung around to position for compression of the bale between the plunger and press-head of the press, while simultaneously another press-box is brought to position under the folder. As previously stated however my invention is not restricted to the particular type of press herein mentioned.

Figure 1:
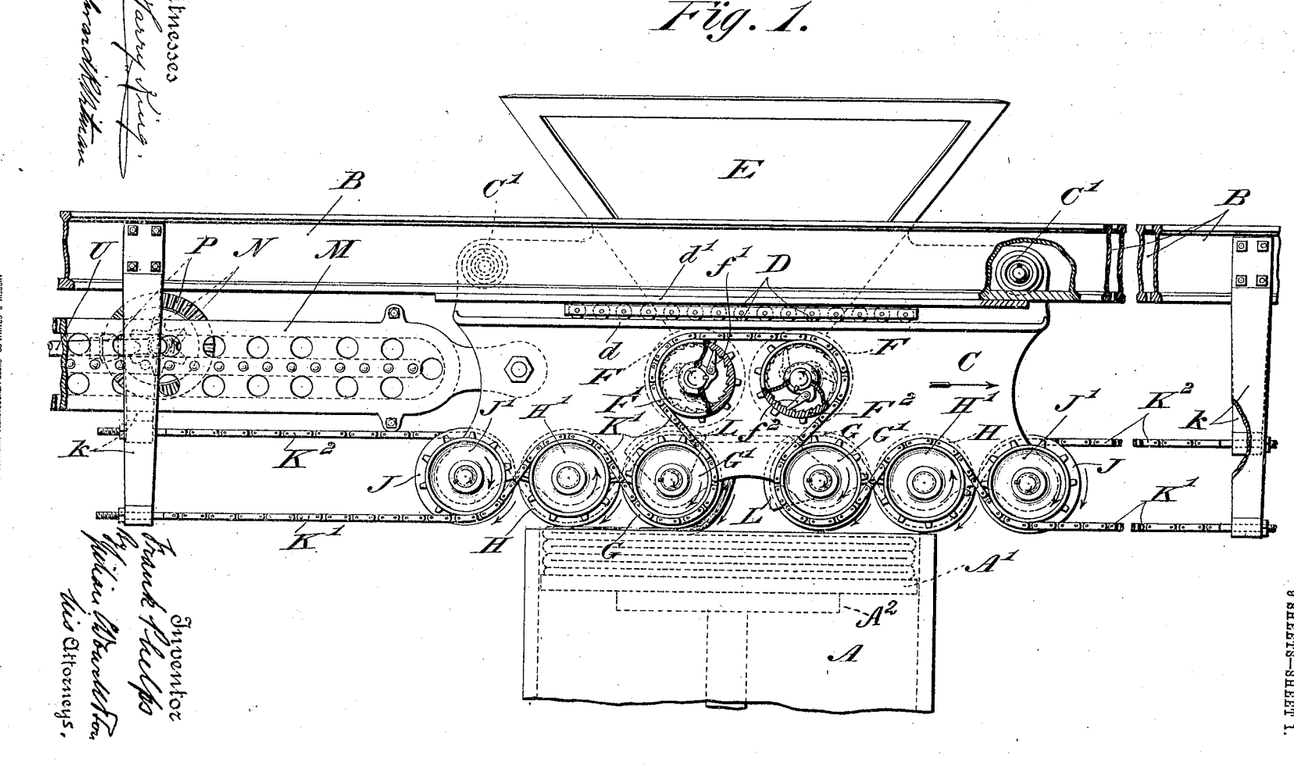
Figure 1 is a front view of a cotton folder embodying my invention with certain minor parts broken away.
Figure 2:
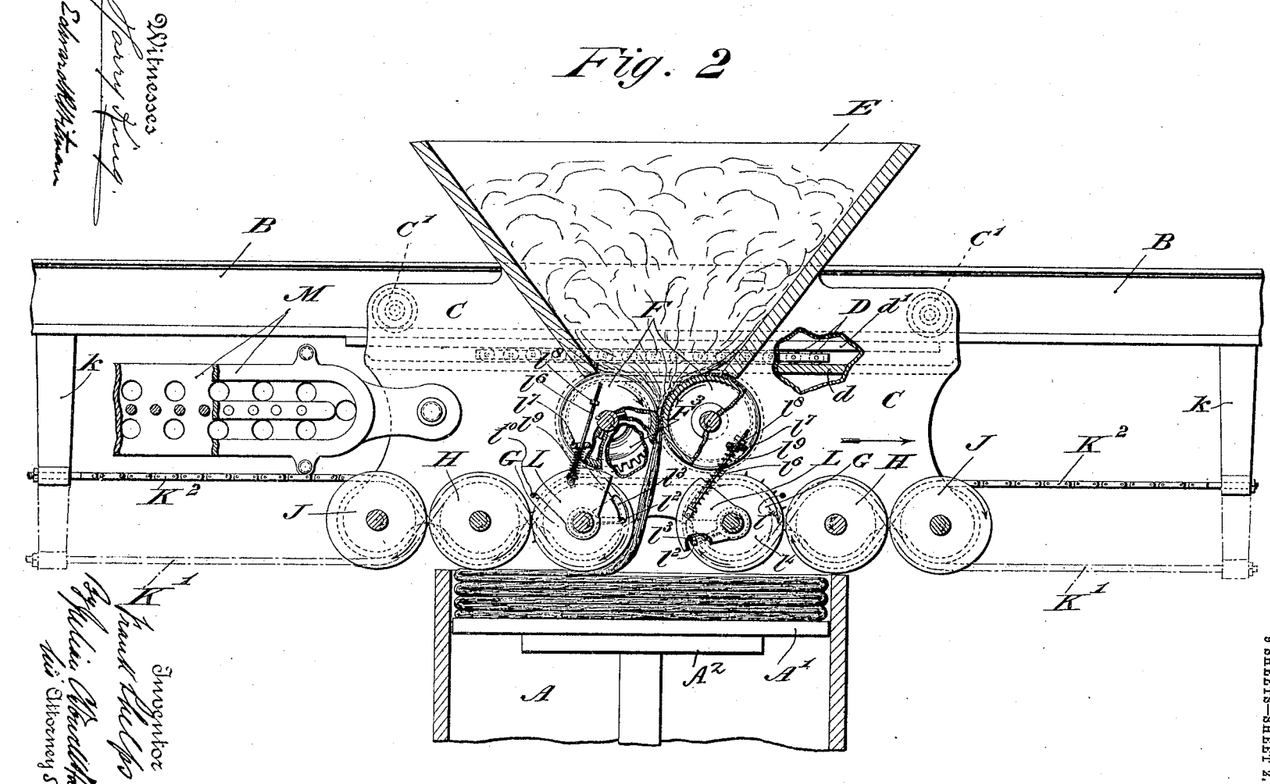
Fig. 2 is a sectional view thereof taken on line 2—2 of Fig. 5.
Figure 5:
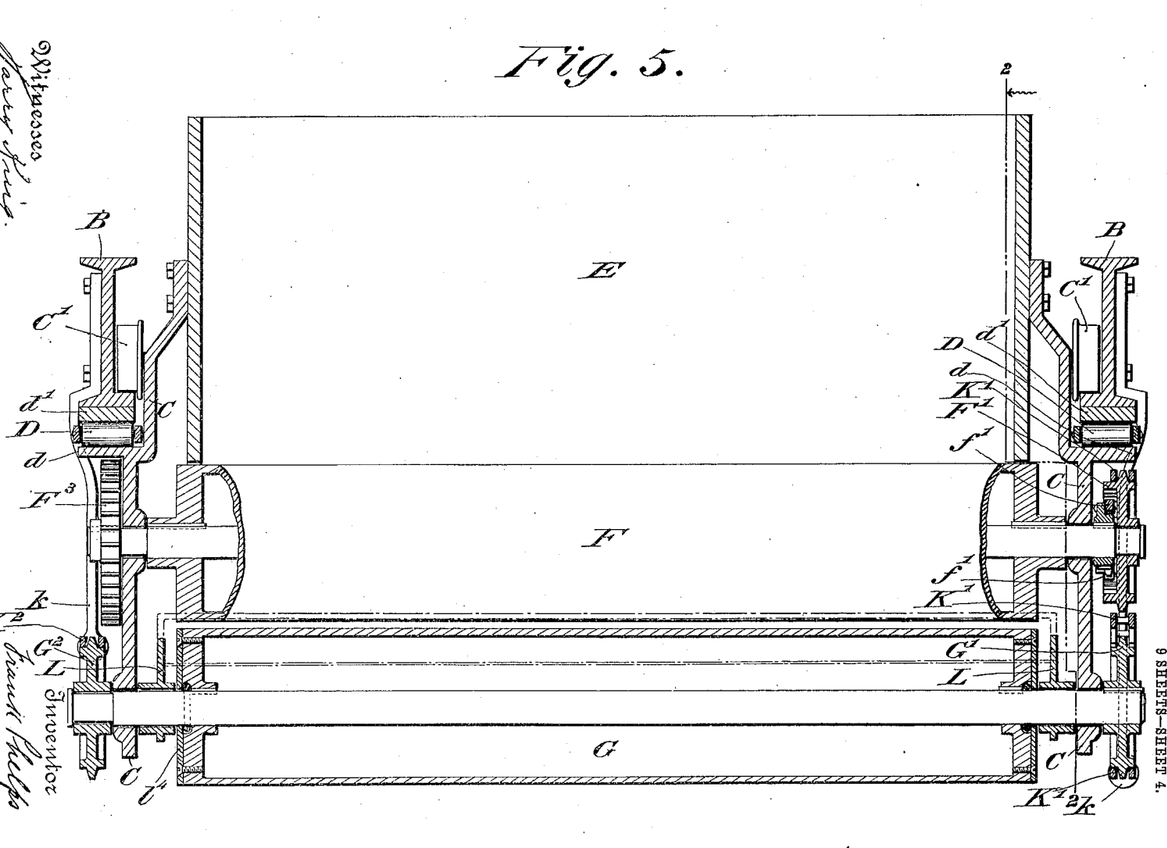
Fig. 5 is an enlarged central vertical cross-section of the apparatus shown in Fig. 1.

Above the press-box a pair of horizontal beams B provide rails for the reciprocatory carriage C, which is shown in Figs. 1, 2 and 5 provided with and sustained from lateral wheels $C^1$ traveling on said rails. Small antifriction rollers D take the upward thrust of the carriage due to the resistance or pressure applied by the receding platen. A series of these rollers, spaced and held together by straps connecting their axles, is arranged at each side, the rollers being supported on a lateral flange $d$ on the carriage and bearing under a strip $d^1$ on the bottom of the beam B, as shown more clearly in Figs. 1 and 5. Pressure or reaction exerted by the platen will thus bear up the carriage against the rollers D. Being arranged between fixed and reciprocating bearing-surfaces, said rollers will travel back and forth only one-half the distance traversed by the carriage, and they are self-operating. The carriage supports a hopper E into which the cotton to be folded is deposited from a condenser or bat-forming apparatus (not shown). Below the hopper are the coacting bat-condensing and feed-rolls F, shown in Figs. 2, 3, 11 and 12. In the lower part of the carriage are the press-rolls, G, H, J, arranged to travel on the same plane, and comprising two groups or sets with an intermediate space for feeding the bat therebetween. They are shown six in number, or three rolls for each set denominated respectively G, H, and J. All the rolls are of course mounted between and have their journal bearings in the opposite sides of the carriage. They operate in a well known manner. That is, as the carriage reciprocates, the cotton bat which is fed from the hopper by the compression and feed-rolls F is folded back and forth by the alternating central press-rolls or folder-rolls G, G, followed by the press-rolls H and J, and is laid thereby in layers upon the receding follower in the press-box. The left hand set of press-rolls G, H, J, roll over and press upon the layer being folded as the carriage travels toward the right, indicated by the arrow in the drawings, while the right hand set of press-rolls G, H, J, roll over and press upon the fold being laid as the carriage travels in the reverse direction or toward the left.

Figure 3:
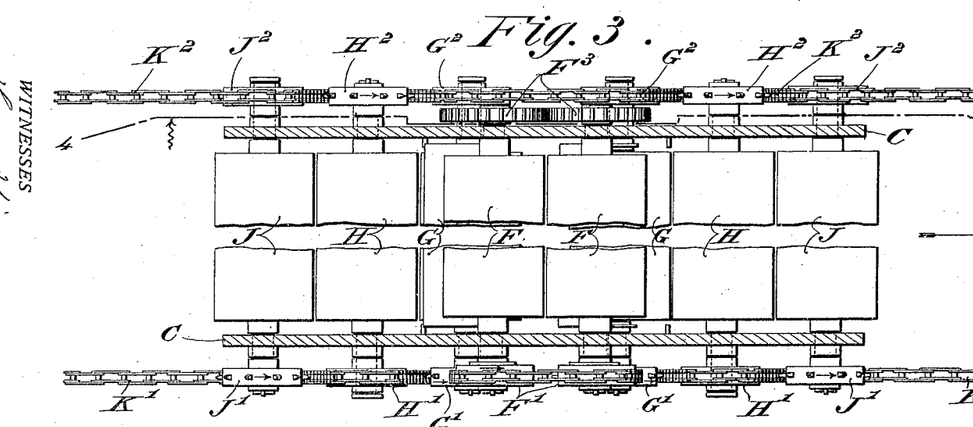
Fig. 3 representing a horizontal section through the carriage shows the rolls together with the chain and sprocket drive mechanism therefor in plan view.
Figure 4:
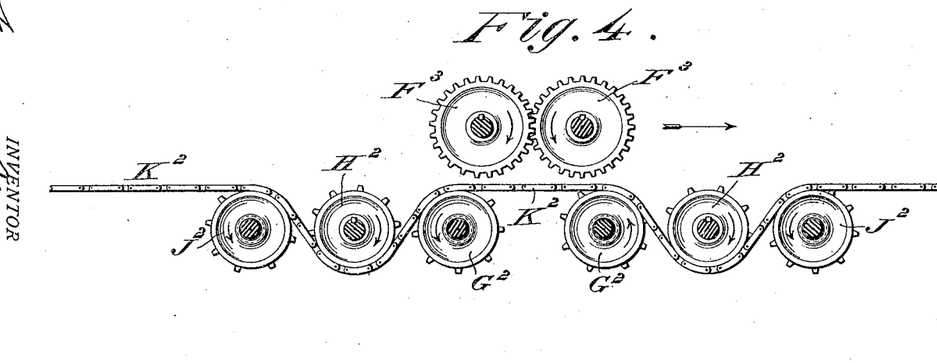
Fig. 4 is a vertical section on line 4—4 of Fig. 3 looking in the direction of the arrow and showing in elevation the chain and sprocket drive at the rear side of the apparatus.

A chain and sprocket drive for the rolls is provided as follows: At the front of the apparatus, a taut stationary sprocket-chain $K^1$ engages sprocket wheels $G^1$, $H^1$, $J^1$ on the shafts or journals of each set of press-rolls G, H, J; and sprocket-wheels $F^1$, $F^2$ on the shafts of the feed-rolls F. The ends of said sprocket-chain $K^1$ are shown attached to hangers $k$ depending from the beam B. Said sprocket-chain passes under wheel $J^1$, over wheel $H^1$ and under wheel $G^1$ of the left-hand set of press-rolls; then over both sprocket-wheels $F^1$, $F^2$ of the feed-rolls; then under wheel $G^1$, over $H^1$ and under wheel $J^1$ of the right hand set of press-rolls, as shown in Figs. 1 and 3. The middle sprocket-wheel $H^1$ for each set of press-rolls is loose or idle, while the sprockets $G^1$ and $J^1$ are fast on their shafts. The sprockets $F^1$, $F^2$ are connected to their shafts by any ordinary clutches, pawl and ratchet clutches being shown and respectively denominated $f^1$ and $f^2$. These clutches operate reversely, one clutching while the other releases. Each clutch will operate when the sprocket-chain revolves the sprocket-wheel in the direction for feeding the bat, indicated by the arrows in Figs. 2, 11 and 12, but will release the sprocket from its shaft and allow it to act as an idler when the sprocket-chain revolves the wheel in the contrary direction. By this construction, when the carriage travels toward the right as indicated by the arrow in Figs. 1, 3, 11 and 12, the fast sprocket-wheels $G^1$, $J^1$ and clutched sprocket $F^2$ are thereby caused to drive the corresponding rolls in the proper direction for operation; while the loose sprockets $H^1$ and unclutched sprocket $F^1$ merely serve as idlers. When the carriage travels toward the left, the operation is simply reversed, the sprocket $F^1$ being clutched with its shaft, while the sprocket $F^2$ is released and acts as an idler. At the rear side of the machine, as shown in Figs. 2, 3 and 4, the shafts of the condensing and feed-rolls F are provided with intermeshing gears $F^3$, whereby one roll F is always revolved from the other; and a second sprocket chain $K^2$ engages sprocket wheels $G^2$, $H^2$, $J^2$ on the shafts or journals of each set of press-rolls. In this case, the intermediate sprocket $H^2$ of each set is fast on its shaft, while the other sprockets $G^2$ and $J^2$ are loose; and the sprocket chain $K^2$ passes under the fast sprockets $H^2$ and over the loose sprockets $G^2$ and $J^2$. Hence the intermediate press-rolls H, driven from the rear side by the chain $K^2$ and sprockets $H^2$, will always revolve in the same direction as the other press-rolls G and J which are driven by the front chain $K^1$ and sprockets $G^1$ and $J^1$. It is noted that the rolls F will always revolve oppositely in the same direction, that is in the direction for feeding the bat from the hopper, irrespective of the direction of motion of the carriage. For, when the carriage is moving toward the right, the front sprocket-chain $K^1$ drives the intergeared rolls F from the sprocket-wheel F², which at this time is clutched to its shaft while the other sprocket F¹ is released or idle; and when the carriage is moving toward the left the chain drives said rolls F by the sprocket F¹ which is clutched to its shaft while the other sprocket F² is idle.

The principle of the chain and sprocket drive above set forth may of course be applied where a greater or lesser number of press-rolls are employed. For example, if a fourth roll were included in each set, the front sprocket-chain K¹ would simply pass over loose sprockets thereon, while the rear sprocket-chain K² would engage under fast sprockets thereon.

It will be observed that the fast sprockets and loose sprockets constitute drive-wheels or drivers and idlers respectively, and that the drive chains constitute taut flexible driving elements, one of which engages under drivers on both sets of press-rolls and runs over and engages the clutch-connected wheels on the feed-rolls, while the other element runs alternately over and under the alternating idlers and drivers at the rear side of the machine.

Figure 11:
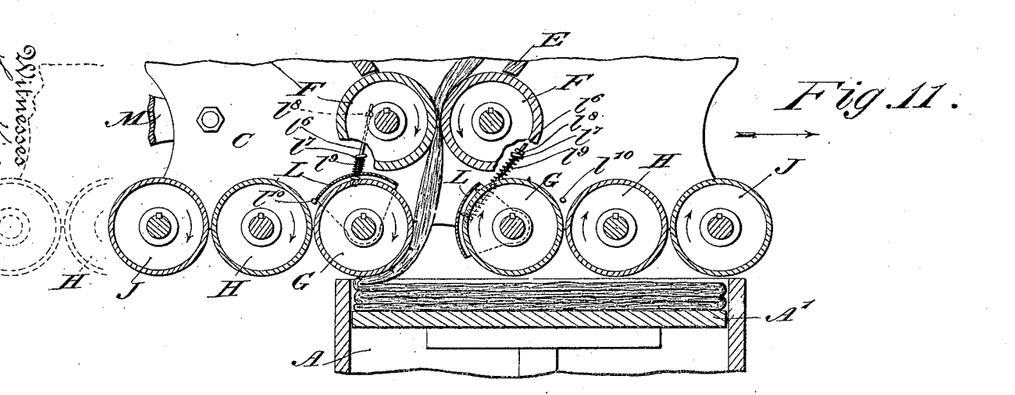
Fig. 11 is a sectional view of the folder in the act of folding the bat at one side of the press-box.
Figure 12:
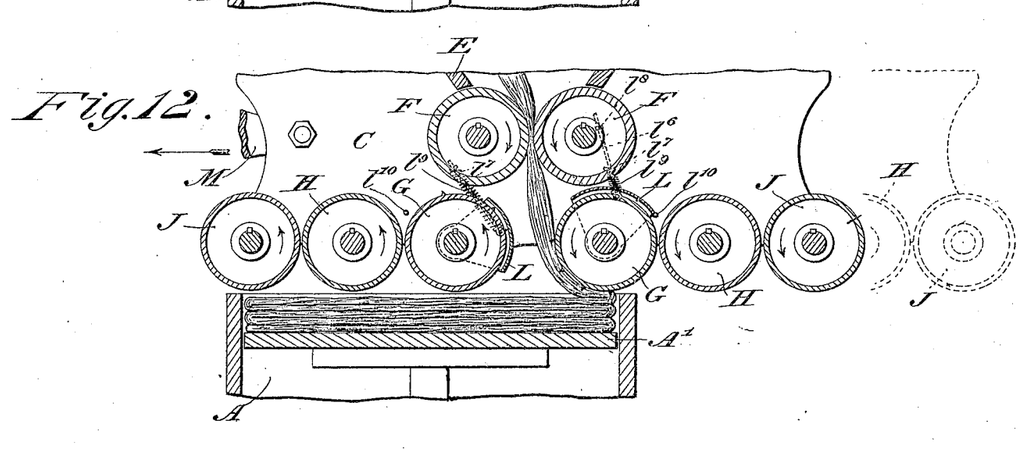
Fig. 12 is a similar view of the folder traveling in the opposite direction and folding the bat at the opposite side of the press-box.
Figures 13, 14:
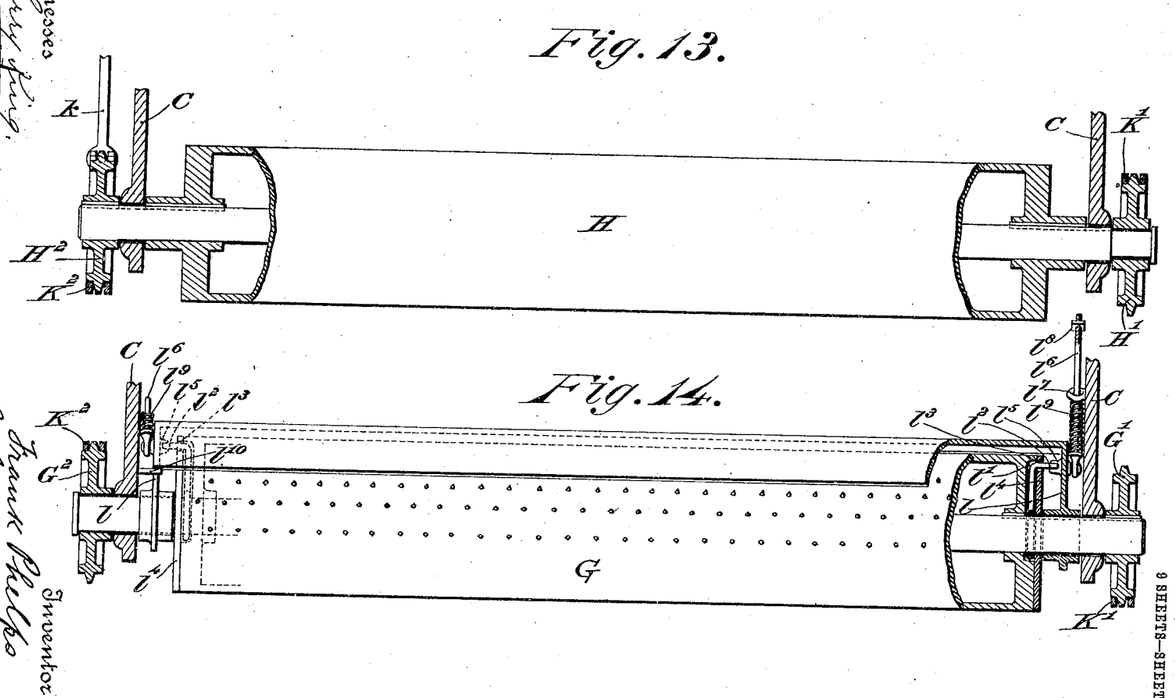
Fig. 13 is an elevation of one of the press-rolls adjacent to the central or folder-rolls, with parts thereof in section.
Fig. 14 is an elevation of one of the central press-rolls or folder-rolls with the hood applied thereto, showing parts in section.

The central press-rolls or folder-rolls G, that is the two rolls approximately under the bat-condensing and feed-rolls F, are or may be provided on a portion of their surfaces with starting spikes or points $g$ for engaging the lap upon each change of motion or reciprocation of the carriage. See Figs. 2, 6, 11, 12, and 14. To guard the receding roll, the said rolls G are equipped with segmental hoods L, each adapted to cover about one-fourth of the surface of the roll. As shown in Figs. 2, 11 and 12, the hood of the advancing folding-roll (whichever that may be, depending upon the direction of travel of the carriage) is carried in a raised position, allowing said roll to advance on the bat; while the hood of the receding roll is carried in a downward position to prevent contact of the cotton with said roll. At the end of each travel of the carriage, the upright hood of the advancing roll is thrown down, thereby forcing the bat off said roll and allowing said roll to reverse, and protecting the roll from the bat which is being fed from the rolls F. Simultaneously the hood of the receding roll is thrown up to allow said roll to advance upon the bat and fold it back upon the subjacent layer. In Fig. 11, the folder moving toward the right is shown in the act of folding or starting the lap back upon itself at the left hand side of the press-box. In Fig. 12, the folder moving toward the left is shown folding the bat at the right hand side of the press-box. The dotted lines in these figures indicate the limits of travel to the right and left. It will be noted that in each figure the hood L is raised on the advancing roll G, while down on the receding roll; the advancing roll in Fig. 11 being the receding one in Fig. 12.

Figures 6, 7, 8, 9, 10:
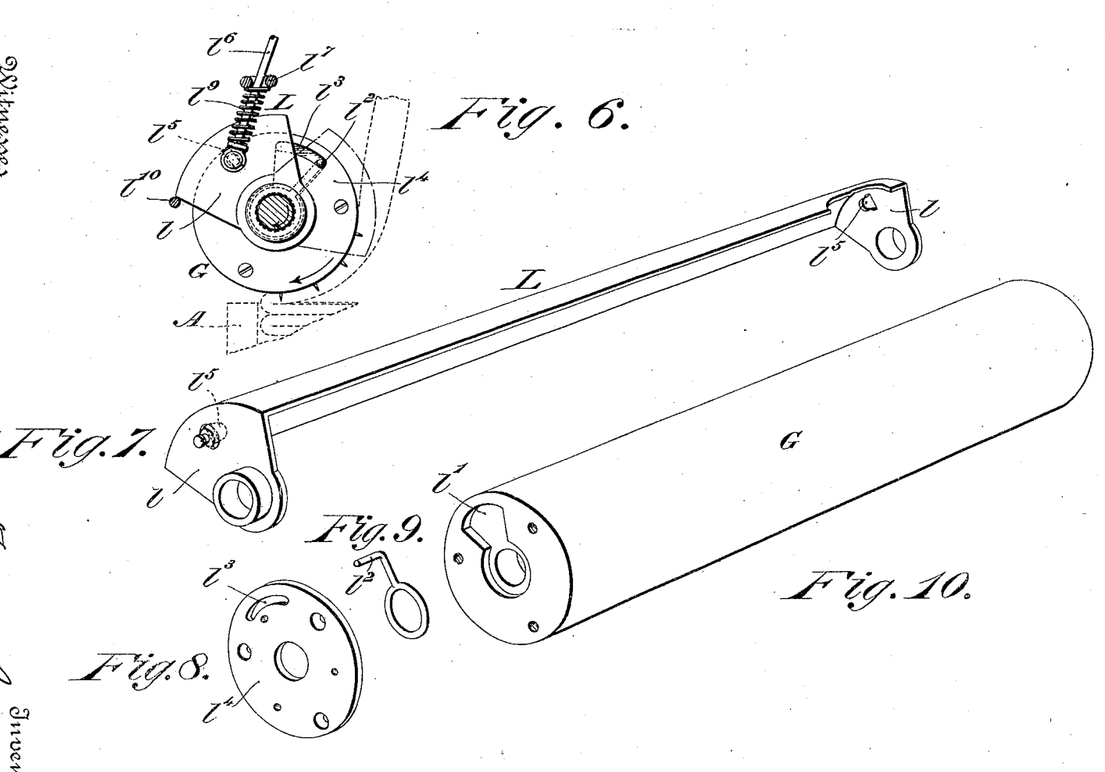
Fig. 6 is an end view of one of the central press-rolls, or what may be termed a folder-roll, just starting a fold of the bat.
Fig. 7 is a detail perspective view of one of the hoods with which the central press-rolls or folder-rolls are equipped.
Fig. 8 shows detached one of the end-plates of the folder-roll.
Fig. 9 is a device used on the axle of the folder-roll in connection with the operation of the hood which is shown in Fig. 7.
Fig. 10 is a perspective view of one of the folder-rolls or central press-rolls showing its head socketed to receive the device which is shown in Fig. 9.

To explain the operation more fully, a description will be given of one of the central press-rolls G with its hood, both being the same except that the hood of one roll is arranged to be thrown up while the other is thrown down and vice versa. Reference may be made more particularly to Figs. 6 to 10 inclusive. The hood L is a segmental apron having sector arms $l$ at its ends which are mounted loosely upon the shaft or journals of the roll. In each end of the roll is a sector-shaped recess $l^1$ which accommodates a device such as shown in Fig. 9. Said device is also loosely mounted on the journal of the roll and is provided with a finger $l^2$. The finger $l^2$ projects through a segmental slot $l^3$ in a plate $l^4$ attached on the end of the roll, and said finger is adapted to engage a lug $l^5$ on the inner face of the hood-supporting arm $l$. Hence as the roll G revolves, the finger $l^2$ will strike the lug $l^5$ and throw down the hood L at the limit of travel in one direction; then the roll reverses its revolution so that the finger $l^2$ will swing around and strike the lug $l^5$ at the opposite side and throw up the hood at the limit of travel in the opposite direction. The sector-shaped recess $l^1$ in the end of the roll allows a certain independent play of the finger $l^2$ before it will throw the hood; and the angular size of this recess will depend upon the travel of the carriage in relation to the diameter of the roll. To the supporting arm $l$ of the hood L is pivotally attached a rod $l^6$ guided through an eye $l^7$ which may be fixed to the inner face of the side of the carriage, as shown in Figs. 2, 3, 6, 11, 12 and 14. On the upper end of said rod is a stop or nut $l^8$. A coil spring $l^9$ is arranged between the eye $l^7$ and the point of attachment of the rod to the hood. This spring and rod control the throw of the hood. When the hood is thrown down, the rod slides down the limit allowed by its stop $l^8$. When the hood is thrown up, the rod slides up through the eye, and the spring $l^9$ is compressed until it is moved past the center. The back of the hood may lodge against pins $l^{10}$ fixed to the inner faces of the sides of the carriage, the compressed spring $l^9$ holding it in this position, as shown more clearly in Figs. 2 and 6.

Summarizing the operation, in action the cotton is dropped into the hopper E from the condenser, then passes through the compression and feed rollers F, which are always caused to revolve oppositely in the same direction, thus forming the cotton into a bat. As the folder reciprocates across the bale being laid upon the receding follower in the press-box, the bat is folded alternately by and under the rolls G, G. As the folder reaches the limit of its travel in either direction, the swinging fingers $l^2$ come in contact with the hoods L, thus raising the hood of the receding roll and allowing the hood of the advancing roll to be thrown down, so that on return motion of the carriage the advancing roll can fold the bat while the hood on the receding roll protects it.

It will be noted that the diameters of the press-rolls are greater than the diameters of the sprockets which drive them. By this means, the driving chains being stationary and the sprocket-wheels rolling back and forth on the same, the press-rolls have a greater peripheral speed than the sprockets, and the peripheries of the rolls have a greater travel than the longitudinal motion of the machine. This avoids uneven folding of the bat. Experience has shown that a cotton-folder has a tendency to push the fold ahead of the press-rolls, piling up the same in the center of the press-box and causing the bale to buckle while being pressed. By the apparatus shown, the cotton can be folded evenly in the box and the bale compressed without undue strain on the press-box.

The history of the cotton-folder shows that the vital point in successfully folding cotton is that the fold must be made in exactly the same place at each reciprocation. If not, the bale will have a tendency to buckle or bulge, causing great strain on the box. By the apparatus described, the fold is broken at the same place each time.

Figure 15:
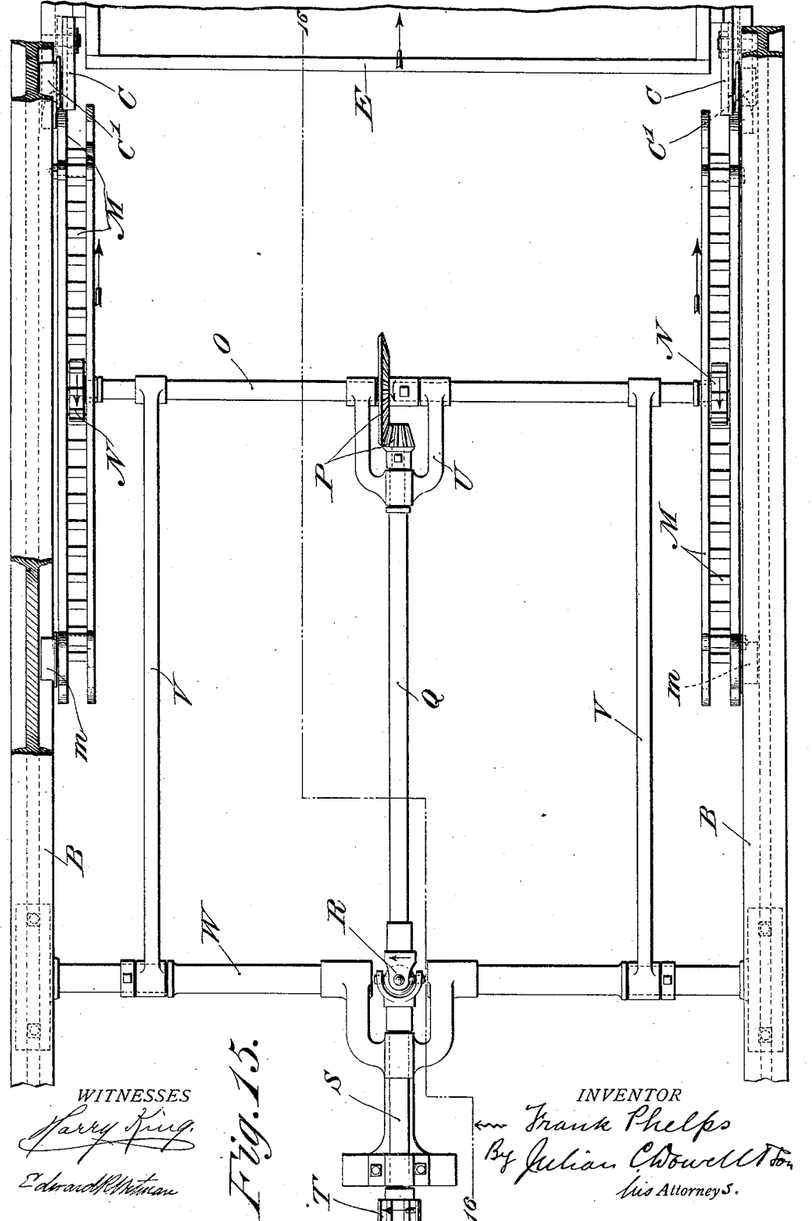
Fig. 15 is a plan view of the power mechanism for reciprocating the carriage.
Figure 16:
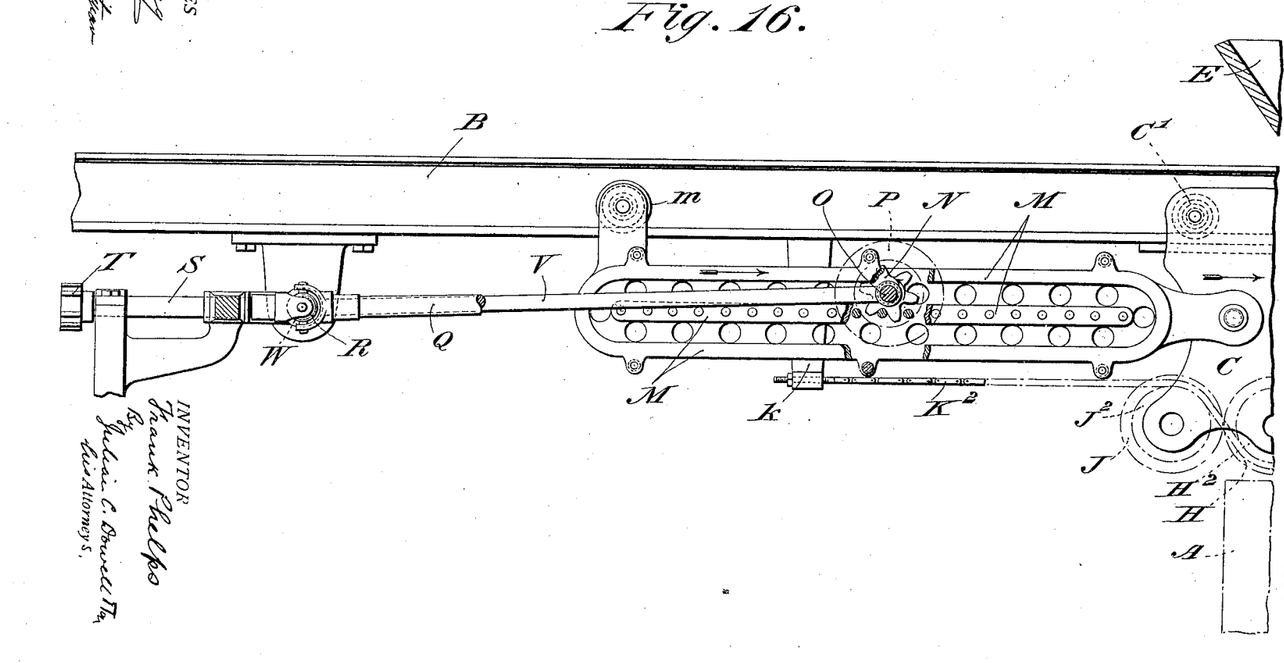
Fig. 16 is a section on line 16—16 of Fig. 15, looking in the direction of the arrow.

Mechanism for reciprocating the folder is provided as follows: At one end of the apparatus, the side members of the carriage are connected to traveling mangle-racks M, whose outer ends are supported by hangers from rollers m running on the carriage-rails. Said mangle-racks are engaged by star-wheels or pinions N on a shaft O which is driven by bevel gears P from a swinging shaft Q connected by a knuckle-joint R with a power-shaft S. Power may be applied to shaft S by a drive gear (not shown) meshing with pinion T, or by any other ordinary means, and is communicated to the shaft O and wheels N which reciprocate the mangle-racks. Shaft O is free to rise and fall as the star-wheels N pass from the upper to the lower sides of the mangle-racks. A yoke U provides journal-bearings for the shaft O and the outer end of the swinging transmission shaft Q, holding the gears P in proper relation, and swinging space arms V connected with the stationary shaft W are also provided with journal-supports for shaft O and hold it at a given distance from shaft W while allowing shaft O to rise and fall. Rotary motion of shaft S is thus converted into rectilinear motion by means of the mangle-racks for reciprocating the folder.

While at the present stage of the art it would be impracticable to reciprocate the press-box and drive-chains instead of the carriage, such a reversal in the relative motion is intended to be included within the scope of my invention, as well as modifications in various mechanical details. The term "cotton" is also intended to include any material capable of being folded by this machine.

I claim as my invention and desire to secure by Letters Patent:

1. In a cotton-folder, the combination of oppositely-revolving bat-feeding rolls, and a lower series of press-rolls comprising two sets which roll alternately in opposite directions upon the bat fed therebetween from said feed-rolls, said feed-rolls provided with clutch-connected wheels the clutches of which operate reversely, and a taut flexible driving element engaging drive-wheels on rolls of both sets and engaging both clutch-connected wheels.

2. In a cotton-folder, the combination of oppositely-revolving bat-feeding rolls, and a lower series of press-rolls comprising two sets which roll alternately in opposite directions upon the bat fed therebetween from said feed-rolls, said feed-rolls provided with clutch-connected wheels the clutches of which operate reversely, drive-wheels on the shafts of certain of said press-rolls, and a flexible driving element engaging under said drive wheels and engaging over said clutch-connected wheels.

3. In a cotton-folder, the combination of oppositely-revolving bat-feeding rolls, and a lower series of press-rolls comprising two sets which roll alternately in opposite directions upon the bat fed therebetween from said feed-rolls, said feed-rolls provided with clutch-connected wheels the clutches of which operate reversely, drive-wheels on alternate press-rolls, a flexible driving element engaging under said drive-wheels and over said clutch-connected wheels, and another flexible element engaging over idlers on said alternate press-rolls and under drive-wheels on the other press rolls.

4. In a cotton-folder, the combination of oppositely-revolving bat-feeding rolls, and a lower series of press-rolls comprising two sets which roll alternately in opposite directions upon the bat fed therebetween from said feed-rolls, said feed-rolls provided with clutch-connected wheels the clutches of which operate reversely, and each press-roll provided with a drive-wheel and an idler making two series of wheels the drivers of which alternate, and flexible driving elements running over the idlers and under the drivers of the respective series of wheels and one running over said clutch-connected wheels.

5. In a cotton-folder, the combination of a series of press-rolls each having a drive-wheel and an idler making two series of alternating drivers and idlers, and flexible driving elements running alternately over and under the wheels of each series, the overpassing of one element corresponding with the underpassing of the other.

6. In a cotton-folder, the combination of a series of press-rolls alternating ones of which have drive-wheels at one end and idlers at the opposite end while the other rolls have drive-wheels at the same end as and alternating with said idlers, a flexible driving element engaging the first-mentioned drive-wheels on corresponding sides of their peripheries, and another flexible driving element running alternately over and under the alternating drivers and idlers at the other ends of the rolls and engaging the drivers thereof on the same sides of their peripheries as the first-mentioned drivers.

7. In a cotton-folder, the combination of oppositely-revolving bat-feeding rolls provided with clutch-connected wheels the clutches of which operate reversely, and press-rolls having drive-wheels, and a flexible driving element running under said drive-wheels and over said clutch-connected wheels.

8. In a cotton-folder, the combination of coacting bat-feeding rolls geared to revolve oppositely in a direction for feeding the bat, and two sets of bat-folding rolls which alternately roll upon the bat which is being folded back and forth, a sprocket-chain engaging sprocket-wheels on both of said feeding and both sets of folding rolls, and reversely-operating clutches for operatively connecting the wheels of the feeding-rolls therewith.

9. In a cotton-folder, the combination of coacting bat-feeding rolls geared together to revolve oppositely in a direction for feeding the bat, folding rolls which alternately roll upon the bat and fold it back and forth, a sprocket-chain engaging under sprocket-wheels on the folding rolls and over sprocket-wheels on the feeding rolls, the latter sprocket-wheels being loose and having reversely-operating clutches for connecting them with the feeding rolls.

10. In a cotton-folder, the combination of coacting bat-feeding rolls intergeared to revolve oppositely in a direction for feeding the bat, and a lower horizontal series of press-rolls comprising two sets which alternately roll upon the bat which is being folded back and forth, sprocket-wheels with reversely-operating clutches on the feeding roll shafts, alternately fast and loose sprockets on the press-roll shafts, the sprockets on the central press-rolls being fast, and a sprocket chain passing under the fast sprockets, over the loose sprockets, and over the clutch-provided sprockets on the feeding-roll shafts.

11. In a cotton-folder, the combination of coacting bat-feeding rolls intergeared to revolve oppositely in a direction for feeding the bat, and a lower horizontal series of press-rolls comprising two sets which alternately roll upon the bat which is being folded back and forth, sprocket-wheels with reversely-operating clutches on the feeding roll shafts, alternately fast and loose sprockets on the press-roll shafts, the sprockets on the central press-rolls being fast, and a sprocket chain passing under the fast sprockets, over the loose sprockets, and over the clutch-provided sprockets on the feeding-roll shafts, another set of alternately fast and loose sprockets on the press-roll shafts, the arrangement being such that a fast and a loose sprocket is provided for each press-roll, and another sprocket chain passing under the fast sprockets and over the loose sprockets of the last mentioned set.

12. In a cotton-folder, the combination of traveling press-rolls each having a fast sprocket and loose sprocket, each series of sprockets having their fast and loose ones alternating, and sprocket chains passing alternately over and under the sprockets of each series, the overpassing of one sprocket-chain corresponding with the underpassing of the other.

13. In a cotton-folder, the combination of a reciprocatory carriage, bat-folding mechanism carried thereby and comprising folder-rolls which advance alternately in opposite directions on the bat, hoods carried by said rolls adapted to cover a segment of the surface of each roll, and means whereby the hood of the advancing roll is held raised and out of the way of the bat while the hood of the receding roll is lowered to confront the bat.

14. In a cotton-folder, the combination of a reciprocatory carriage, bat-folding mechanism carried thereby and comprising folder-rolls which advance alternately in opposite directions on the bat, hoods carried by said rolls adapted to cover a segment of the surface of each roll, and means whereby the hood of the advancing roll is held raised and out of the way of the bat while the hood of the receding roll is lowered to confront the bat, and means for automatically throwing down the hood of the advancing roll and lifting the hood of the receding roll on completion of each travel of the carriage.

15. In a cotton-folder, a reciprocating folder roll, a hood riding thereon and adapted to cover a portion of its surface, and means carried by the roll adapted to engage and throw the hood oppositely at each reciprocation.

16. In a cotton-folder, a reciprocating folder-roll, a segmental hood riding thereon, and means controlling said hood to maintain a raised position as the roll advances and to throw down the hood at each reciprocation and maintain the hood lowered as the roll recedes.

17. In a cotton-folder, folding-rolls which advance alternately in opposite directions on a bat fed between said rolls, segmental hoods carried by said rolls, the hood of the advancing roll being maintained upright and that of the receding roll lowered to confront the bat, and automatic means for shifting or changing the positions of the hoods at each reciprocation.

18. In a cotton-folder, a reciprocating folder-roll, a segmental hood having supporting arms mounted on the roll-journals, a swinging finger carried at the end of the roll adapted as the roll reciprocates to swing oppositely around and throw the hood in opposite directions.

19. In a cotton-folder, folding-rolls which advance alternately in opposite directions on a bat fed between said rolls, hoods carried by said rolls, each adapted to cover a segment of the surface of its roll, and means for operating said hoods alternately to throw one up and the other down.

20. A reciprocating cotton-folder provided with press-rolls having a greater peripheral travel than the longitudinal motion of the machine.

21. In a cotton-folder, a reciprocating carriage, rails supporting said carriage, and folder mechanism carried thereby, mangle racks connected to the carriage, hangers for said racks depending from rollers running on said rails, a transverse shaft adapted to rise and fall and carrying pinions working said mangle racks, thereby reciprocating the carriage, a drive shaft, and a swinging power-communicating shaft operatively-connecting said drive shaft with said transverse shaft.

In testimony whereof I affix my signature, in presence of two witnesses.

FRANK PHELPS.

Witnesses:
H. A. BABBITT,
A. E. MOORE.